United States Patent
Diemer et al.

(10) Patent No.: US 10,302,010 B2
(45) Date of Patent: May 28, 2019

(54) VALVE ELEMENT FOR CHARGE-PRESSURE REGULATION IN AN EXHAUST-GAS TURBOCHARGER

(71) Applicant: FEINGUSS BLANK GmbH, Riedlingen (DE)

(72) Inventors: Reinhard Diemer, Altheim (DE); Ingo Bitzer, Bad Waldsee (DE)

(73) Assignee: FEINGUSS BLANK GMBH, Riedlingen (DE)

( * ) Notice: Subject to any disclaimer, the term of this patent is extended or adjusted under 35 U.S.C. 154(b) by 156 days.

(21) Appl. No.: 15/431,874

(22) Filed: Feb. 14, 2017

(65) Prior Publication Data
US 2017/0248071 A1  Aug. 31, 2017

(30) Foreign Application Priority Data
Feb. 26, 2016  (DE) ........................ 10 2016 002 269

(51) Int. Cl.
| F02B 37/18 | (2006.01) |
| F16K 15/02 | (2006.01) |
| F16K 31/44 | (2006.01) |

(52) U.S. Cl.
CPC .......... F02B 37/186 (2013.01); F02B 37/183 (2013.01); F16K 15/028 (2013.01); F16K 31/44 (2013.01); Y02T 10/144 (2013.01)

(58) Field of Classification Search
CPC ...... F16K 15/028; F16K 31/44; Y02T 10/144; F02B 37/186; F02B 37/183
USPC ........................ 251/337, 298, 84–87; 60/602
See application file for complete search history.

(56) References Cited

U.S. PATENT DOCUMENTS

| 298,865 | A | * | 5/1884 | Leng | ....................... F16K 1/482 251/86 |
| 3,963,211 | A | * | 6/1976 | Myers | ....................... F16K 1/22 251/86 |
| 8,205,448 | B2 | * | 6/2012 | Koch | .................... F01D 17/105 251/298 |
| 8,459,022 | B2 | * | 6/2013 | Cizek | .................... F01D 17/105 251/298 |
| 8,667,794 | B2 | * | 3/2014 | Perrin | ................... F01D 17/141 251/337 |

(Continued)

FOREIGN PATENT DOCUMENTS

| DE | 10 2010 055382 | 6/2012 |
| DE | 10 2010 038908 | 9/2012 |

(Continued)

*Primary Examiner* — John Bastianelli
(74) *Attorney, Agent, or Firm* — Shlesinger, Arkwright & Garvey LLP

(57) ABSTRACT

Valve element for an exhaust-gas turbocharger, having a spindle which has a longitudinal extent, a lever which extends from the spindle laterally in relation to the longitudinal extent of said spindle and which has a through opening, a valve flap plate, a substantially disc-shaped fastening element, and a shank which extends through the through opening and which connects the valve flap plate to the fastening element, wherein the valve flap plate and the fastening element are connected to one another by way of a shank extending through the through opening of the lever, and wherein a spring element is provided for generating a preload between shank and lever.

10 Claims, 19 Drawing Sheets

(56) References Cited

U.S. PATENT DOCUMENTS

| | | | | |
|---|---|---|---|---|
| 2012/0055154 | A1* | 3/2012 | Ebert | F01D 17/105 60/602 |
| 2012/0292547 | A1* | 11/2012 | Kierat | F02B 37/18 251/231 |
| 2014/0321986 | A1* | 10/2014 | Takahashi | F02B 37/183 415/145 |
| 2014/0345273 | A1 | 11/2014 | Yamaguchi et al. | |
| 2014/0366530 | A1* | 12/2014 | Murayama | F02B 37/183 60/602 |
| 2015/0285133 | A1* | 10/2015 | Byon | F02B 37/186 60/602 |
| 2016/0010687 | A1* | 1/2016 | Dilalan | F16B 19/05 384/274 |
| 2016/0178028 | A1* | 6/2016 | Lummer | F02B 37/186 251/321 |
| 2016/0341112 | A1* | 11/2016 | Goeckelmann | F02B 37/186 |

FOREIGN PATENT DOCUMENTS

| | | |
|---|---|---|
| DE | 10 2011 076 361 | 11/2012 |
| DE | 10 2011 111 817 | 2/2013 |
| DE | 10 2015 008 426 | 1/2016 |
| DE | 10 2015 209 042 | 11/2016 |
| EP | 17152628.8 | 6/2017 |
| WO | WO 2013/098884 | 7/2013 |

* cited by examiner

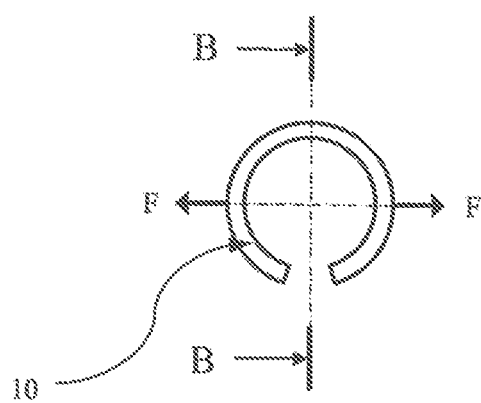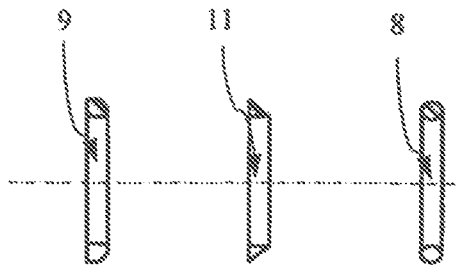
FIG. 4   FIG. 5   FIG. 6   FIG. 7

VALVE ELEMENT FOR CHARGE-PRESSURE REGULATION IN AN EXHAUST-GAS TURBOCHARGER

TECHNICAL FIELD

The present invention relates to a valve element and in particular to a valve element for use for charge-pressure regulation in an exhaust-gas turbocharger.

DESCRIPTION OF THE PRIOR ART

Valve elements for exhaust-gas turbochargers are known and are described for example in DE 10 2015 008 426 A1.

Valve elements of said type are commonly referred to as wastegate valves. The general and known mode of operation of an exhaust-gas turbocharger with a wastegate valve device will be described below with reference to FIGS. 1 and 20.

During operation of the engine under load, the wastegate valve element 1—comprising a rotatably mounted spindle 2, a lever 3 which is attached to one end of the spindle and which projects laterally and which has a through opening, a (valve) flap plate 4 with a shank which is attached to or integrated with the flap plate centrally on one side and which is provided for being led through the lever opening, and a disc 5 as a fastening element on a led-through shank end of the flap plate 4—is closed by way of an actuating drive 22 and an actuating arrangement 24. Here, the flap plate 4 is pressed against a valve seat 23 by pivoting of the valve element 1. In this way, the entire exhaust-gas flow is conducted via an exhaust-gas-side turbine wheel 19 which is fixedly connected to a connecting shaft 20 and to an intake-side compressor wheel 21. The exhaust-gas flow accelerates the turbine wheel 19 together with the connecting shaft 20 and the intake-side compressor wheel 21. The required combustion air is thereby compressed by the compressor wheel 21 and supplied, at positive pressure, via the charge-air cooler to a combustion chamber, which leads to significantly improved and more effective combustion of the fuel and to a greater power output of the engine.

During partial-load or overrun operation of the engine, the air compression is required to a lesser extent, or is not required. Therefore, during this type of driving, the actuating drive 22 opens the valve 1 by way of the actuating arrangement 24, and allows the major part of the exhaust-gas flow to escape directly, and without being diverted by the turbine wheel 19, through the "wastegate" into the exhaust tail pipe, and the air compression is reduced or eliminated. Here, the engine backpressure is also reduced. The lower backpressure reduces the pumping work and improves fuel economy.

During operation, the problem arises that the temperature of the exhaust gas can reach temperatures of over 1,000° C. The heat that is generated here is released non-uniformly to the mechanical components involved. This can give rise to stresses and distortion in the mechanical components (housing, flap plate 4, valve seat 23, lever 3 etc.—cf. FIG. 20). In the case of a rigid arrangement of the components of flap plate 4 and lever 3, this can lead to leaks between the valve seat 23 and the sealing surface of the valve plate 4, because the flap plate may set down on the valve seat in a skewed manner.

In order to realize a compensation here, it is known for the connection between flap plate 4 and lever 3 to be realized with a certain radial clearance between flap plate shank and lever bore and with a certain axial clearance between lever 3 and fastening disc 5, that is to say the flap plate shank with the flap plate wobbles in the lever bore. If the wastegate valve element 1 is opened by way of the actuating drive 22 and the actuating arrangement 24, a major part of the exhaust gas flows at high speed in turbulent fashion over the flap plate 4 fastened with a clearance to the lever 3, and causes said flap plate to flutter. Here, the flap plate 4 may strike the lever 3 and/or the valve seat 23 in uncontrolled fashion, and the disc 5 may strike the lever 3. This gives rise to an undesired rattling noise, and can lead to increased wear on the individual elements.

SUMMARY OF THE INVENTION

In contrast thereto, the invention proposes a valve element having the features as disclosed herein.

The invention is based on the concept of further developing a generic valve element such that a spring element is provided for generating a preload between shank and lever.

According to the invention, the spring element may be designed to impart a radial spring force action relative to the valve plate shank.

With the solution according to the invention, a disturbing fluttering of the valve flap plate that has hitherto occurred when the wastegate is open is prevented, and thus the rattling noise is eliminated. Furthermore, the wear on the individual components of a wastegate valve device is reduced by way of a valve element according to the invention.

Further refinements of the invention are described herein.

Further advantages and refinements of the invention will emerge from the description and from the appended drawings.

It is self-evident that the features mentioned above and the features yet to be discussed below may be used not only in the respectively specified combination but also in other combinations or individually without departing from the scope of the present invention.

The invention is illustrated in the drawing in highly schematic form, and not to scale, on the basis of exemplary embodiments, and will be described in detail below with reference to the drawing.

BRIEF DESCRIPTION OF THE DRAWING

FIG. 4 shows a ring-shaped spring element according to the invention with a cutout for a disc-mounted arrangement, in a plan view.

FIG. 5 shows a sectional illustration through an embodiment of the spring element according to the invention as per the section line B-B in FIG. 4, with a first profile shape.

FIG. 6 shows a sectional illustration through a further embodiment of the spring element according to the invention as per the section line B-B in FIG. 4, with a second profile shape.

FIG. 7 shows a sectional illustration through a further embodiment of the spring element according to the invention as per the section line B-B in FIG. 4, with a third profile shape.

DETAILED DESCRIPTION

Figure 1:
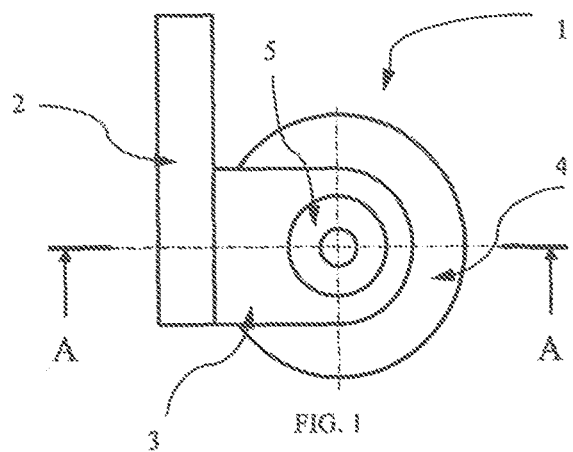
FIG. 1 shows an assembled wastegate valve element with pivotable spindle, lever projecting laterally therefrom, flap plate and disc, in a plan view.
Figure 2:
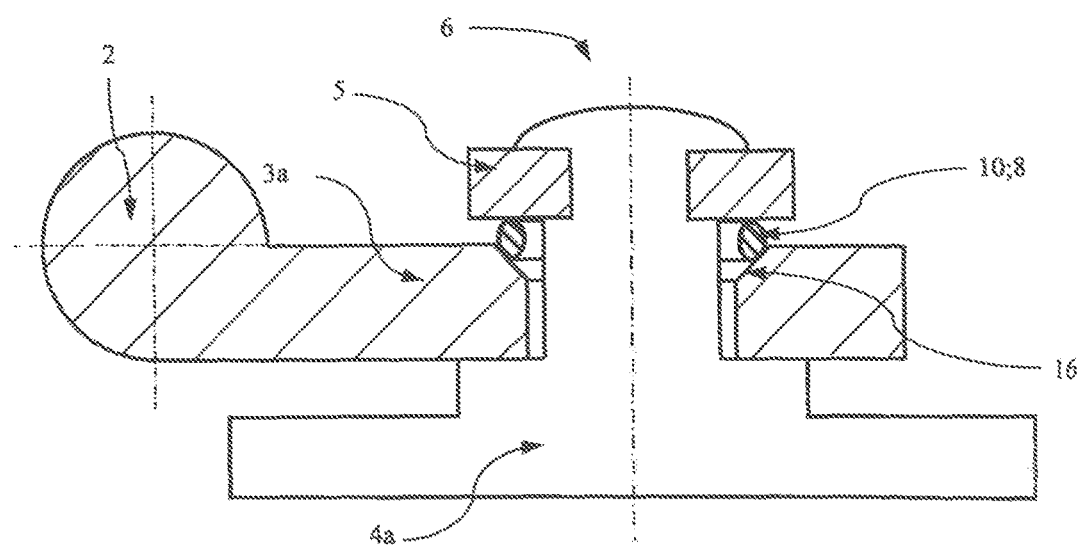
FIG. 2 shows a wastegate valve element according to the invention in a lateral sectional illustration as per the section line A-A in FIG. 1.

FIG. 2 shows the section A-A through the valve element 1 in the case of a riveted version 6 with a ring-shaped spring element 10 or 25 with elliptical (circular) profile 8 in a disc-mounted configuration. The shank of the flap plate for riveted fastening 4a is led through the opening in the lever 3a. At the plate side, the lateral surface of the lever 3a rests or abuts flat against the elevated surface of the flap plate 4a. It is possible to see the radial clearance between the lever bore and the flap plate shank. On the disc, at the lever bore, it is possible to see the bevel 16 in which the spring element 10 or 25 is arranged with a clearance with respect to the flap plate shank. The disc 5 is riveted so as to abut against the shoulder on the flap plate shank, wherein the spring element 10 or 25 is pushed into the bevel 16 slightly and, in the process, is preloaded. The spacing between the disc-side lever surface and lever-side disc surface is the axial clearance (gap dimension) by which the flap plate with shank and fixedly riveted-on disc 5 can move in an axial direction in the lever bore. The cross section of the spring element 10 or 25 must be larger than the axial clearance. Thus, the spring element 10 or 25 cannot emerge from its introduction region. If the flap plate 4a is pressed onto a valve seat 23 which is skewed owing to distortion, this also gives rise to a skewed position of the flap plate with shank and disc. As a result, the spring element is pushed deeper into the bevel 16 and, in the process, is radially compressed by the oblique bevel 16, and is placed under even greater load. The restoring force of the spring element 10 or 25 increases until the disc 5 sets down on the lever surface. The mechanical end stop is thus reached, and the spring element 10 or 25 can expand no further. Overloading of the spring element 10 or 25 is thus prevented (in this regard, see also FIG. 16 and FIG. 16a). If the wastegate valve device is opened, the restoring force of the spring element 10 or 25 has the effect, via the bevel 16, that the flap plate 4a immediately returns in an axial direction into its initial position and is held there by the preload, even if it is impinged on by a flow of the exhaust gas. Rattling is thus prevented.

Figure 3:
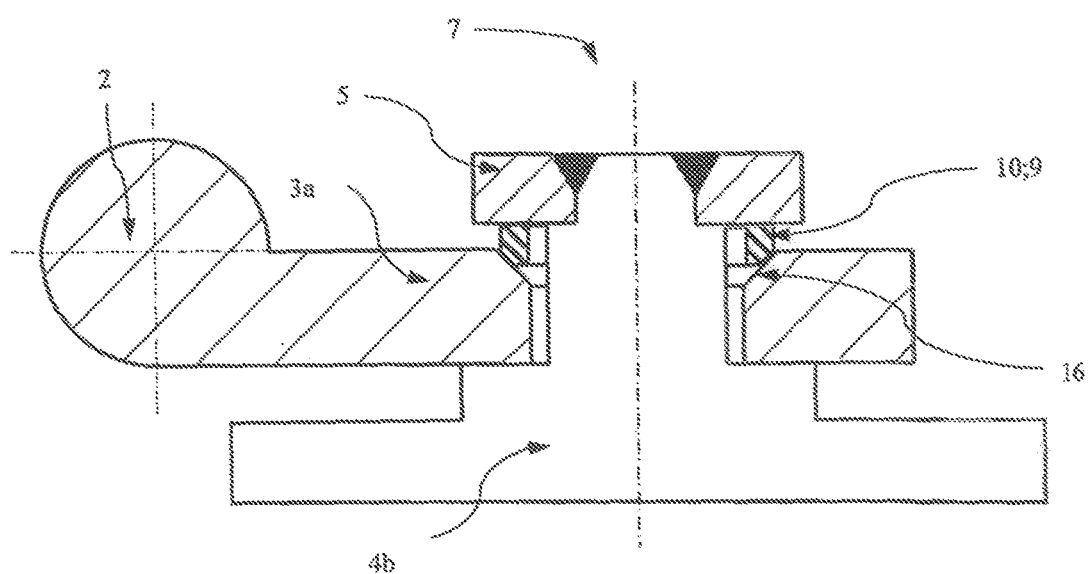
FIG. 3 shows an alternative embodiment of the wastegate valve element from FIG. 2, in a lateral sectional illustration.

FIG. 3 is a variant of FIG. 2. FIG. 3 shows the section A-A through the valve element 1 in the case of a welded version 7 with ring-shaped spring element 10 or 25, which has a profile 9 in the shape of a rectangle with a truncated corner, in a disc-mounted configuration. The shank of the flap plate for welded fastening 4b is led through the opening in the lever 3a. At the plate side, the lateral surface of the lever 3a rests flat against the elevated surface of the flap plate 4b. It is possible to see the radial clearance between the lever bore and the flap plate shank. On the disc, at the lever bore, it is possible to see the bevel 16 in which the spring element 10 or 25 is arranged with a clearance to the flap plate shank. The disc 5 is welded so as to abut against the shoulder on the flap plate shank, wherein the spring element 10 or 25 is pushed into the bevel 16 slightly and, in the process, is preloaded. The spacing between the disc-side lever surface and lever-side disc surface is the axial clearance (gap dimension) by which the flap plate with shank and fixedly welded-on disc 5 can move in an axial direction in the lever bore. The cross section of the spring element 10 or 25 must be larger than the axial clearance. Thus, the spring element 10 or 25 cannot emerge from its introduction region. If the flap plate 4b is pressed onto a valve seat which is skewed owing to distortion, this also gives rise to a skewed position of the flap plate with shank and disc. As a result, the spring element is pushed deeper into the bevel 16 and, in the process, is radially compressed by the oblique bevel 16, and is placed under even greater load. The restoring force of the spring element 10 or 25 increases until the disc 5 sets down on the lever surface. The mechanical end stop is thus reached, and the spring element 10 or 25 can expand no further. Overloading of the spring element 10 or 25 is thus prevented (in this regard, see also FIG. 16 and FIG. 16a). If the wastegate valve is opened, the restoring force of the spring element 10 or 25 has the effect, via the bevel 16, that the flap plate 4b immediately returns in an axial direction into its initial position and is held there by the preload, even if it is impinged on by a flow of the exhaust gas. Rattling is thus prevented.

FIG. 4 shows the ring-shaped spring element with a cutout for disc-mounted arrangement 10, in a plan view. The ring is not closed, such that a spring travel is possible. The spring force acts radially.

FIG. 5 shows the section B-B through the spring element for disc-mounted arrangement 10 with a profile 9 which is rectangular with a truncated corner, FIG. 6 shows the section B-B through the spring element for disc-mounted arrangement 10 with a triangular profile 11, and FIG. 7 shows the section B-B through the spring element for disc-mounted arrangement 10 with an elliptical (circular) profile 8.

Figure 8:
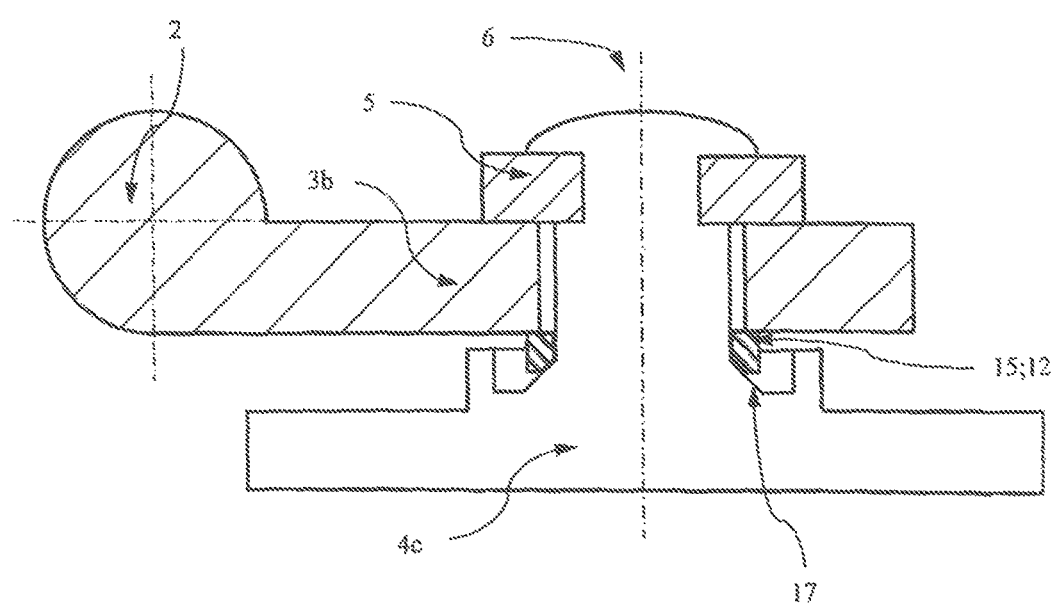
FIG. 8 shows a further embodiment of the valve element according to the invention in a lateral sectional illustration as per the section line A-A in FIG. 1.

FIG. 8 shows the section A-A through the wastegate valve element 1 in the case of a riveted version 6 with ring-shaped spring element 15 or 25, which has a profile 12 in the shape of a rectangle with a truncated corner, in a plate-mounted configuration. The shank of the flap plate for riveted fastening 4c is led through the opening in the lever 3b. At the disc side, the lateral surface of the lever 3b rests flat against the lever-side surface of the disc 5. It is possible to see the radial clearance between the lever bore and the flap plate shank. In the elevated region of the flap plate 4c, a ring-shaped groove is formed in coaxially with respect to the shank, which ring-shaped groove transitions into a bevel 17 on the flap plate shank. The ring-shaped groove is the introduction region for receiving the ring-shaped spring element 15 or 25 when the latter is pushed downward by the plate-side surface of the lever 3b. The spring element 15 or 25 is arranged on the flap plate shank without a clearance. The disc 5 is riveted so as to abut against the shoulder on the flap plate shank. Here, the spring element 15 or 25 is pushed into the bevel 17 slightly and, in the process, is preloaded. The spacing between the plate-side lever surface and the elevated ring on the flap plate 4c is the axial clearance (gap dimension) by which the flap plate with shank 4c and fixedly riveted-on disc 5 can move in an axial direction in the lever bore. The cross section of the spring element 15 or 25 must be larger than the axial clearance. Thus, the spring element 15 or 25 cannot emerge from its introduction region. If the flap plate 4c is pressed onto a valve seat 23 which is skewed owing to distortion, this also gives rise to a skewed position of the flap plate with shank 4c and disc 5. As a result, the spring element is pushed deeper into the bevel 17 and, in the process, is radially expanded by the oblique bevel 17, and is placed under even greater load. The restoring force of the spring element 15 or 25 increases until the lever surface sets down on the flap plate ring. The mechanical end stop is thus reached, and the spring element 15 or 25 can expand no further. Overloading of the spring element 15 or 25 is thus prevented (in this regard, see also FIG. 17 and FIG. 18 and FIG. 19). If the wastegate valve is opened, the restoring force of the spring element 15 or 25 has the effect, via the bevel 17, that the flap plate 4c immediately returns in an axial direction into its initial position and is held there by the preload, even if it is impinged on by a flow of the exhaust gas. Rattling is thus prevented.

Figure 9:
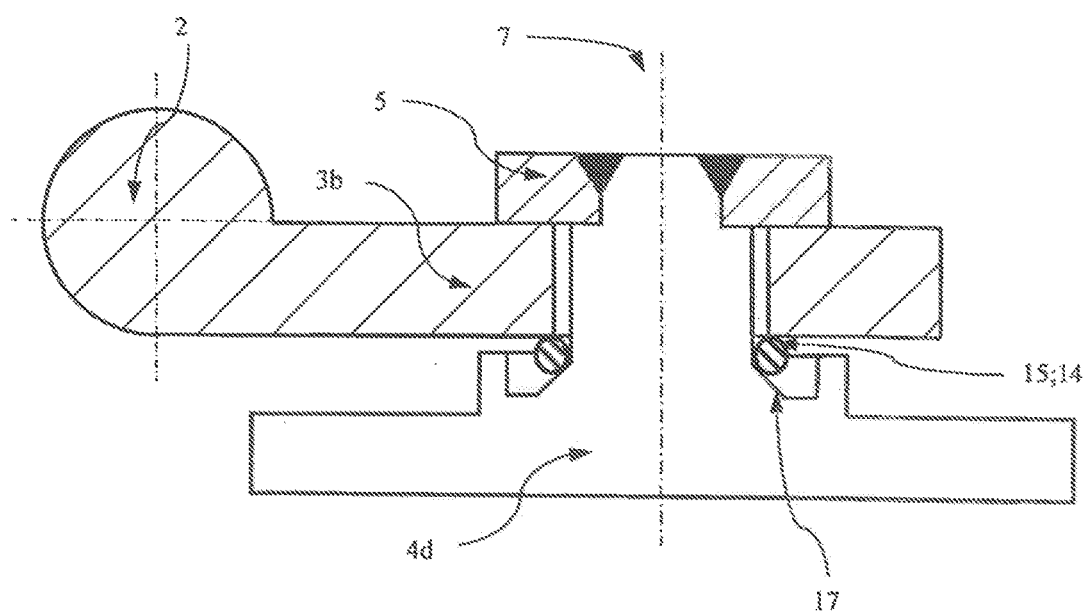
FIG. 9 shows a variant of the valve element according to the invention from FIG. 8.

FIG. 9 is a variant of FIG. 8. FIG. 9 shows the section A-A through the wastegate valve element 1 in the case of a welded version 7 with ring-shaped spring element 15 or 25, which has an elliptical or circular profile 14, in a plate-mounted configuration. The shank of the flap plate for welded fastening 4d is led through the opening in the lever 3b. At the disc side, the lateral surface of the lever 3b rests flat against the lever-side surface of the disc 5. It is possible to see the radial clearance between the lever bore and the flap plate shank. In the elevated region of the flap plate 4d, a ring-shaped groove is formed in coaxially with respect to the shank, which ring-shaped groove transitions into a bevel 17 on the flap plate shank. The ring-shaped groove is the introduction region for receiving the ring-shaped spring element 15 or 25 when the latter is pushed downward by the plate-side surface of the lever 3b. The spring element 15 or 25 is arranged on the flap plate shank without a clearance. The disc 5 is welded so as to abut against the shoulder on the flap plate shank. Here, the spring element 15 or 25 is pushed onto the bevel 17 slightly and, in the process, is preloaded. The spacing between the plate-side lever surface and elevated ring on the flap plate 4d is the axial clearance (gap dimension) by which the flap plate with shank 4d and fixedly riveted-on disc 5 can move in an axial direction in the lever bore. The cross section of the spring element 15 or 25 must be larger than the axial clearance. Thus, the spring element 15 or 25 cannot emerge from its introduction region. If the flap plate 4d is pressed onto a valve seat 23 which is skewed owing to distortion, this also gives rise to a skewed position of the flap plate with shank 4d and disc 5. As a result, the spring element is pushed deeper onto the bevel 17 and, in the process, is radially expanded by the oblique bevel 17, and is placed under even greater load. The restoring force of the spring element 15 or 25 increases until the lever surface sets down on the flap plate ring. The mechanical end stop is thus reached, and the spring element 15 or 25 can expand no further. Overloading of the spring element 15 or 25 is thus prevented (in this regard, see also FIG. 17 and FIG. 18 and FIG. 19). If the wastegate valve device is opened, the restoring force of the spring element 15 or 25 has the effect, via the bevel 17, that the flap plate 4d immediately returns in an axial direction into its initial position and is held there by the preload, even if it is impinged on by a flow of the exhaust gas. Rattling is thus prevented.

Figures 10, 11, 12, 13:
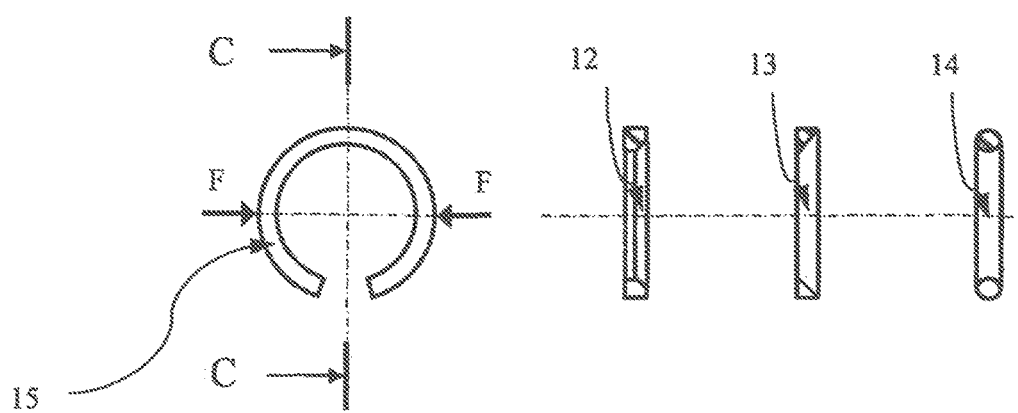
FIG. 10 shows a ring-shaped spring element according to the invention with a cutout for plate-mounted arrangement, in a plan view.
FIG. 11 shows a sectional illustration through an embodiment of the spring element according to the invention as per the section line C-C in FIG. 10, with a first profile shape.
FIG. 12 shows a sectional illustration through a further embodiment of the spring element according to the invention as per the section line C-C in FIG. 10, with a second profile shape.
FIG. 13 shows a sectional illustration through a further embodiment of the spring element according to the invention as per the section line C-C in FIG. 10, with a third profile shape.

FIG. 10 shows the ring-shaped spring element with a cutout for plate-mounted arrangement 15, in a plan view. The ring is not closed, such that a spring travel is possible. The spring force acts radially.

FIG. 11 shows the section C-C through the spring element for disc-mounted arrangement 15 with a profile 12 which is rectangular with a truncated corner, FIG. 12 shows the section C-C through the spring element for disc-mounted arrangement 15 with a triangular profile 13, and FIG. 13 shows the section C-C through the spring element for disc-mounted arrangement 15 with an elliptical (circular) profile 14.

Figure 14:
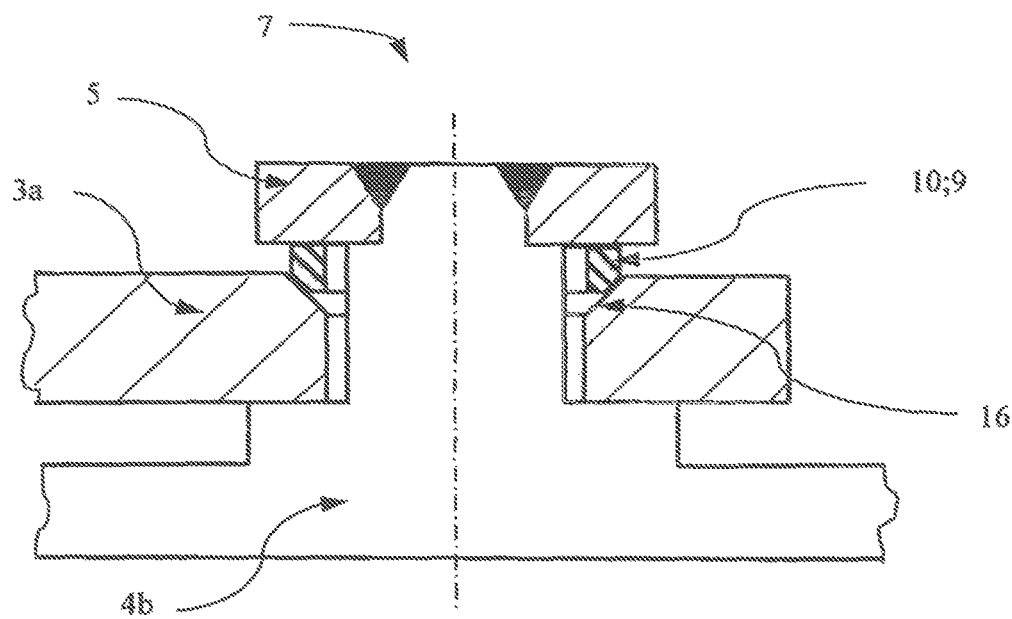
FIG. 14 shows an enlarged detail illustration of FIG. 3.
Figure 15:
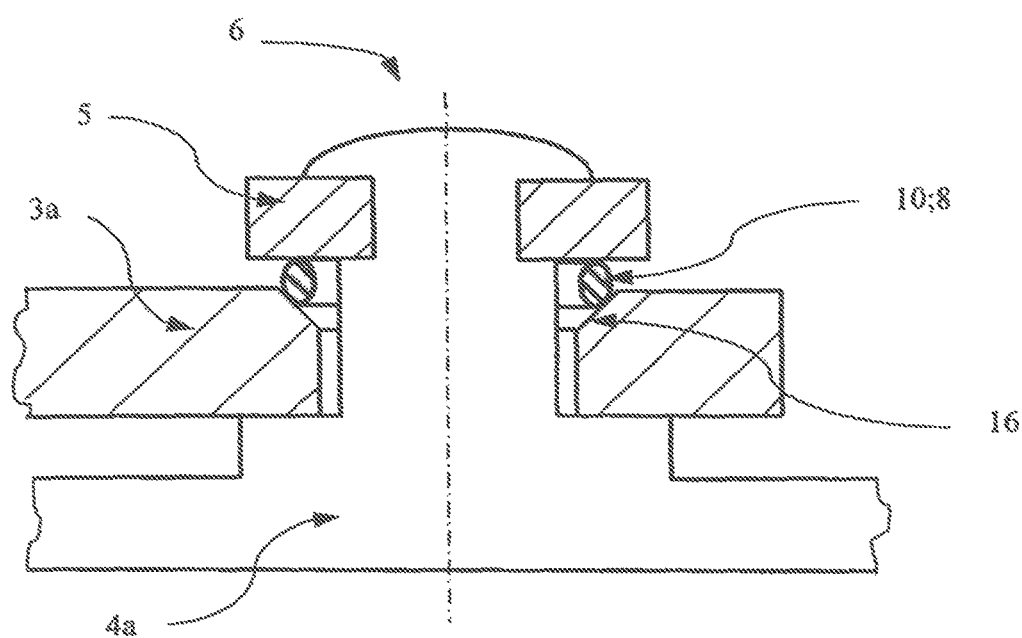
FIG. 15 shows an enlarged detail illustration of FIG. 2.

FIG. 14 shows details of FIG. 3, and FIG. 15 shows details of FIG. 2.

Figure 16:
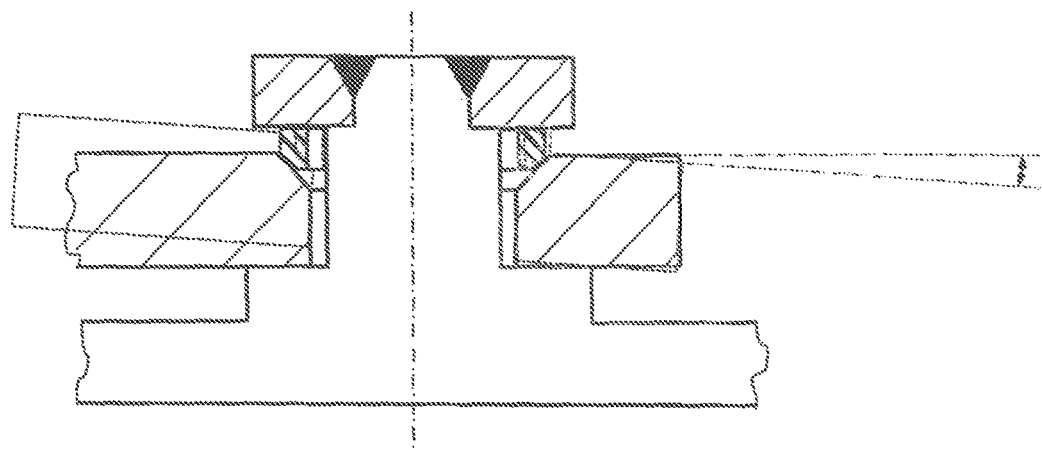
FIGS. 16 and 16a illustrate the mode of operation according to the invention in the case of a flap plate that has set down in skewed fashion, in the case of a disc-mounted configuration.
Figure 16A:
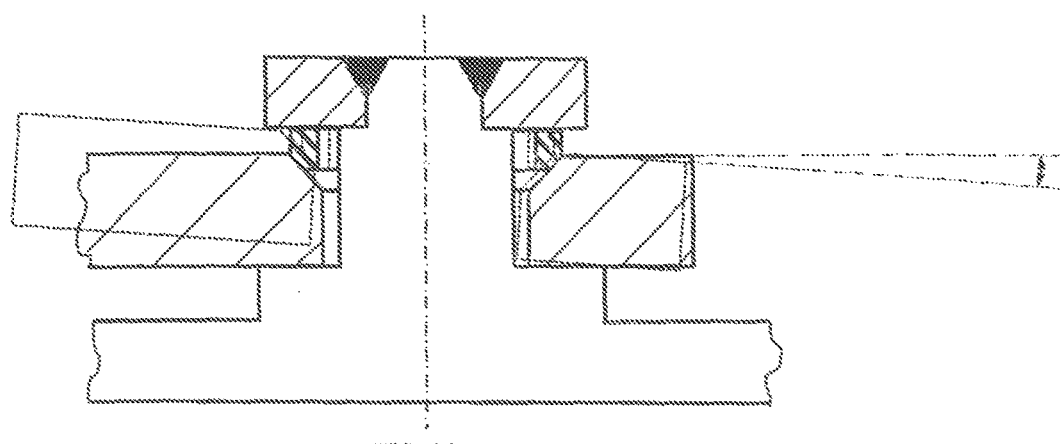

FIG. 16 and FIG. 16a show the mode of operation of the spring element 10 or 25 in the case of a flap plate 4b that has set down in skewed fashion, in the case of a disc-mounted configuration.

Figure 17:
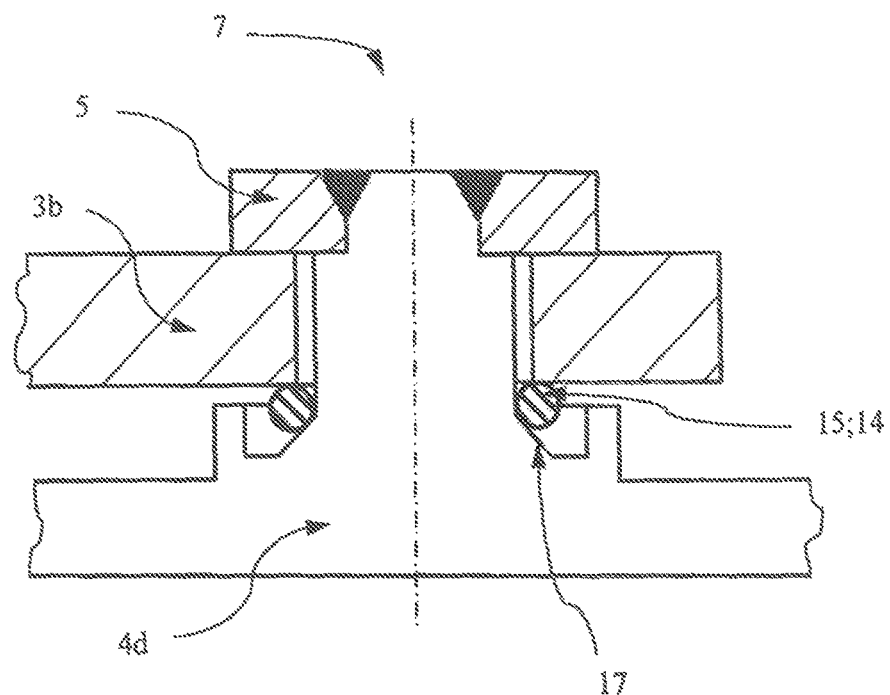
FIG. 17 shows an enlarged detail illustration of FIG. 9.
Figure 18:
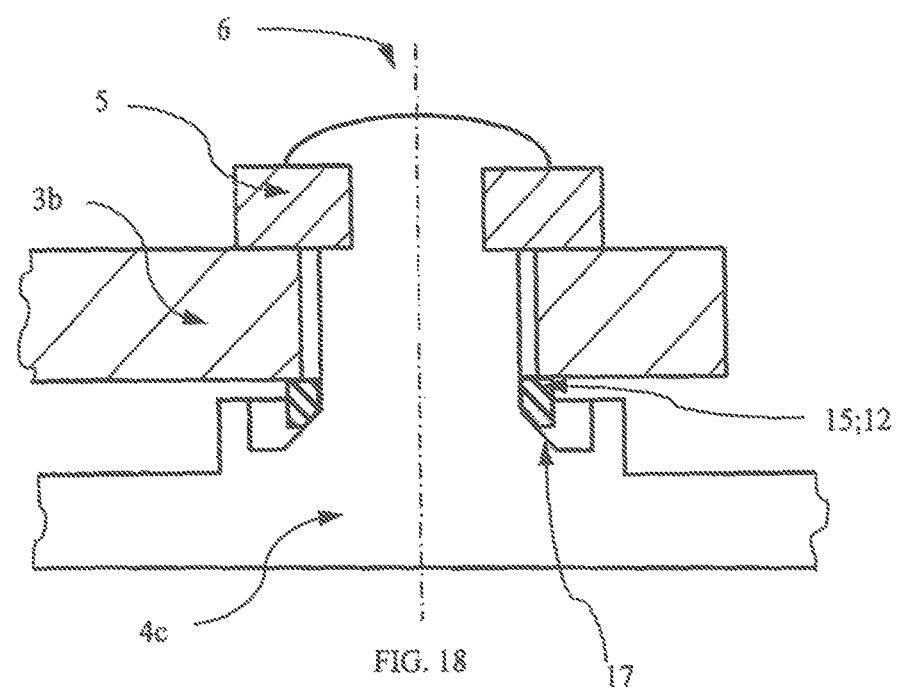
FIG. 18 shows an enlarged detail illustration of FIG. 8.

FIG. 17 shows details of FIG. 9, and FIG. 18 shows details of FIG. 8.

Figure 19:
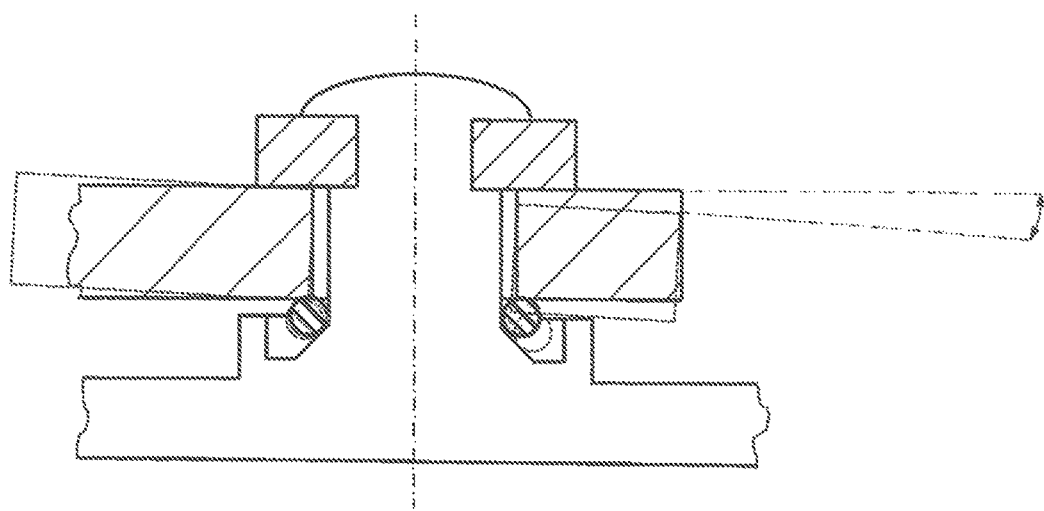
FIG. 19 illustrates the mode of operation according to the invention in the case of a flap plate that has set down in skewed fashion, in the case of a plate-mounted configuration.

FIG. 19 shows the mode of operation of the spring element 15 or 25 in the case of a flap plate 4c that has set down in skewed fashion, in the case of a plate-mounted configuration. Here, it can also be seen, that the setting-down of the flap plate 4c and the orientation take place before the actual exertion of load, and thus more smoothly and in a more material-preserving manner.

Figure 20:
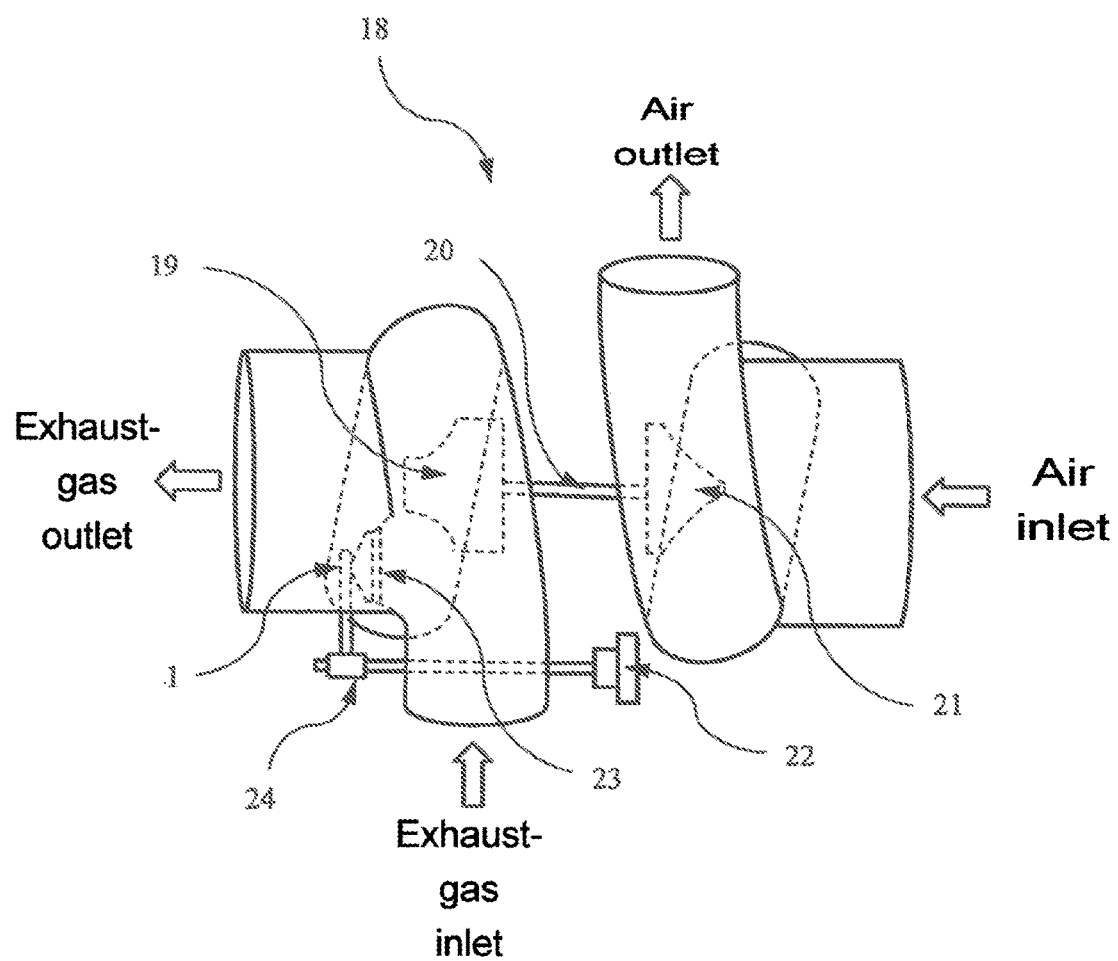
FIG. 20 shows, in a schematic illustration, the mode of operation of an exhaust-gas turbocharger with wastegate valve arrangement.

FIG. 20 schematically shows an exhaust-gas turbocharger 18 with wastegate valve seat 23 and wastegate valve element 1, actuating drive 22 and actuating arrangement 24 for the wastegate valve element 1, the exhaust-gas-side turbine wheel 19 with connecting shaft 20, and the inlet-air-side compressor wheel 21.

Figure 21:
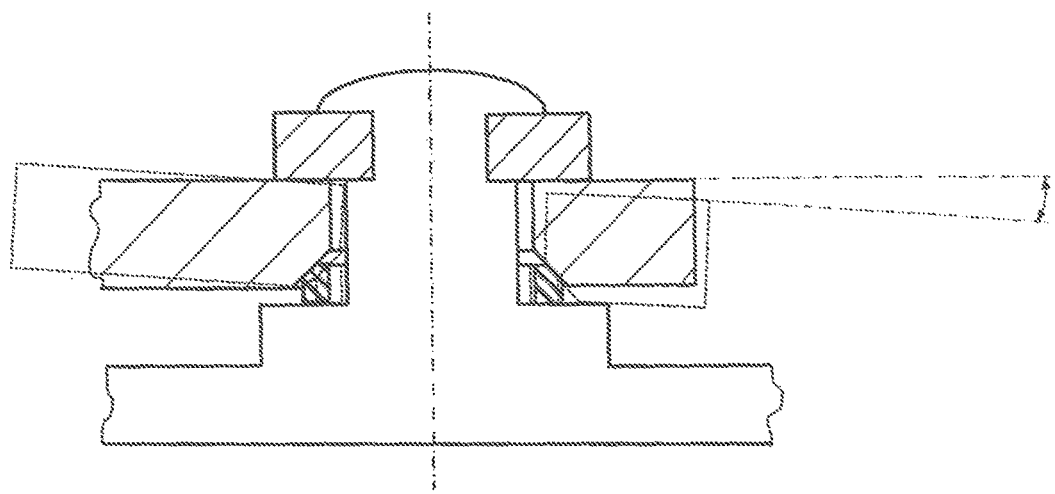
FIGS. 21 and 22 show enlarged detail illustrations of the embodiment of FIG. 8, with a bevel arranged in the lever bore.
Figure 22:
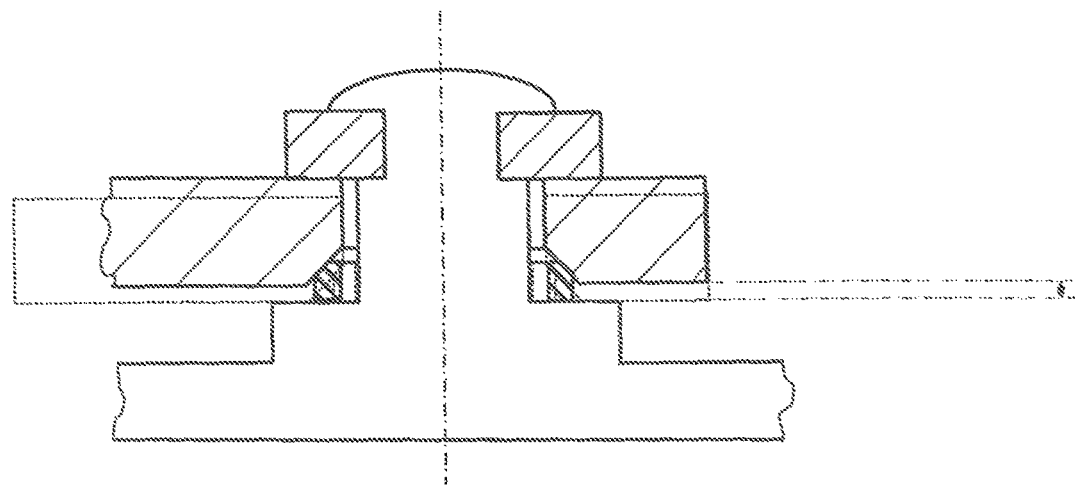

FIG. 21 and FIG. 22 correspond, in terms of mode of operation, to FIG. 8, but here, the bevel is arranged not in a ring-shaped groove in the flap plate but rather in the lever bore.

Figure 23:
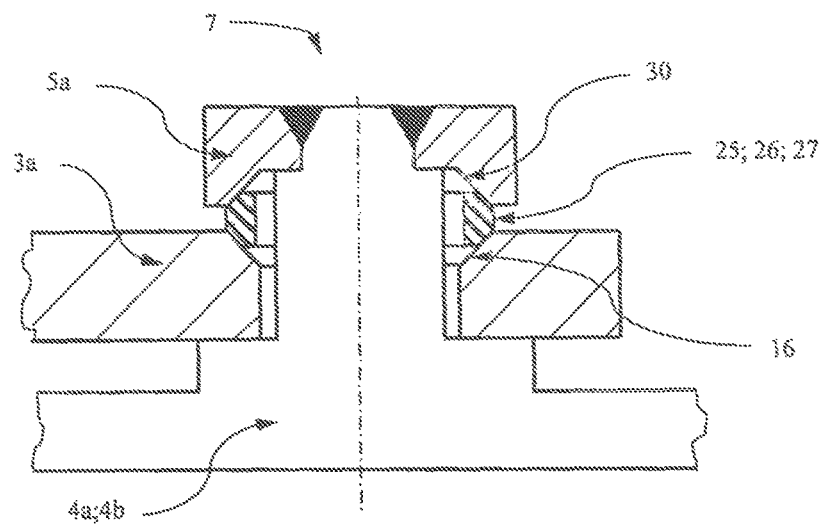
FIGS. 23 and 23a show enlarged detail illustrations of the embodiment of FIG. 28, which is a welded version.
Figure 23A:
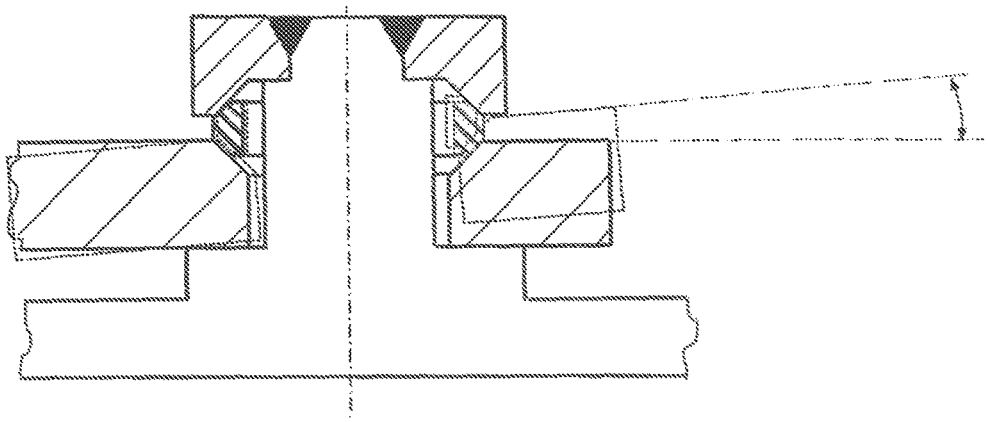
Figure 28:
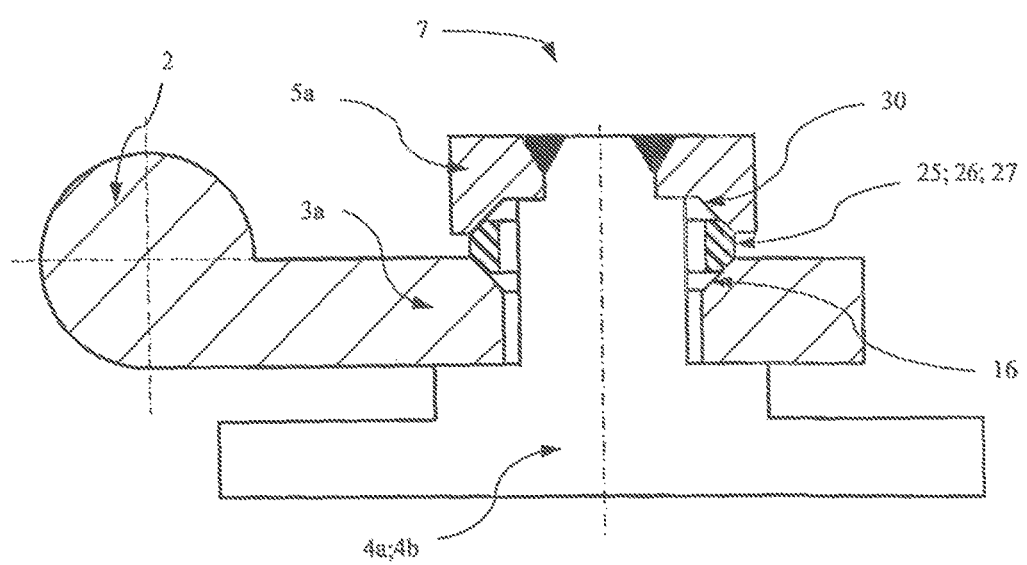
FIG. 28 shows the section A-A through the valve element according to the invention with ring-shaped spring element in a disc-mounted configuration, in a welded variant.

FIG. 23 and FIG. 23*a* show details of FIG. 28 as a welded version.

Figure 24:
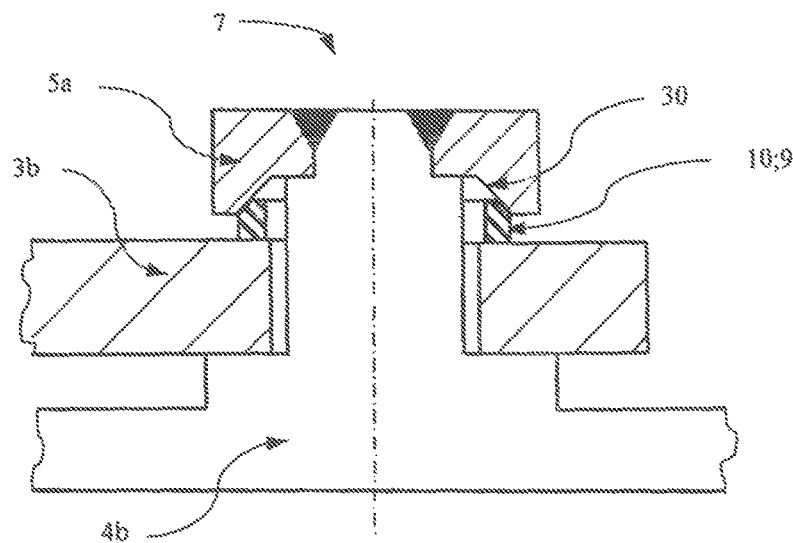
FIGS. 24 and 24a show enlarged detail illustrations of the embodiment of FIG. 3, with a bevel arranged in the disc bore.
Figure 24A:
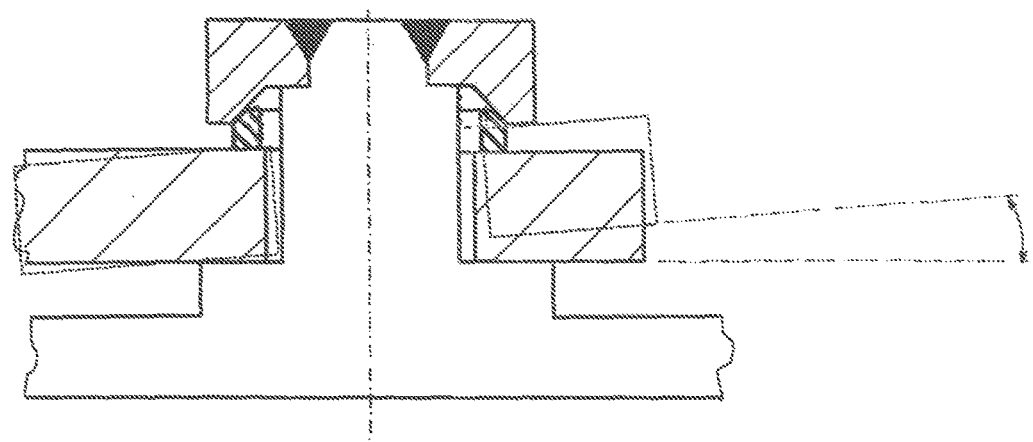

FIG. 24 and FIG. 24*a* correspond, in terms of mode of operation, to FIG. 3, but here, the bevel is arranged not in the lever bore but rather in the disc bore.

Figure 25:
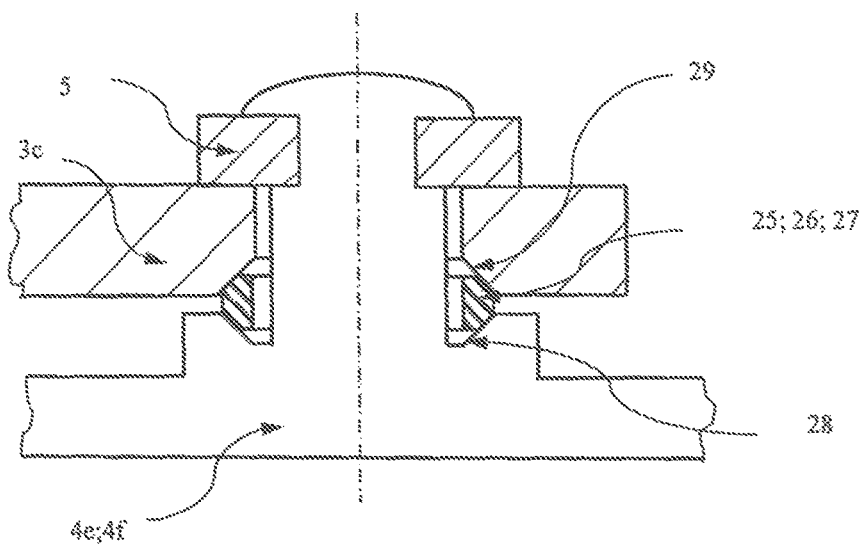
FIGS. 25 and 25a show enlarged detail illustrations of the embodiment of FIG. 27 as a riveted version.
Figure 25A:
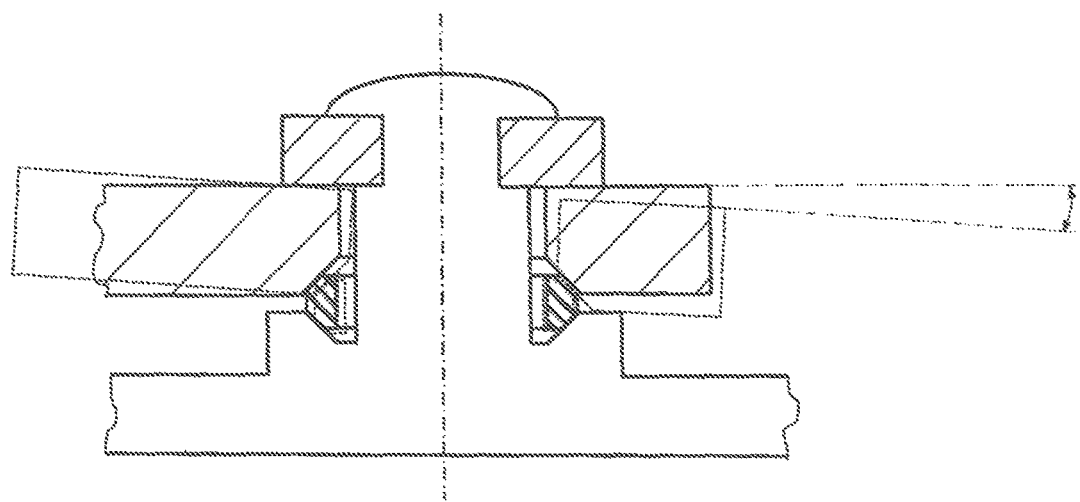
Figure 26:
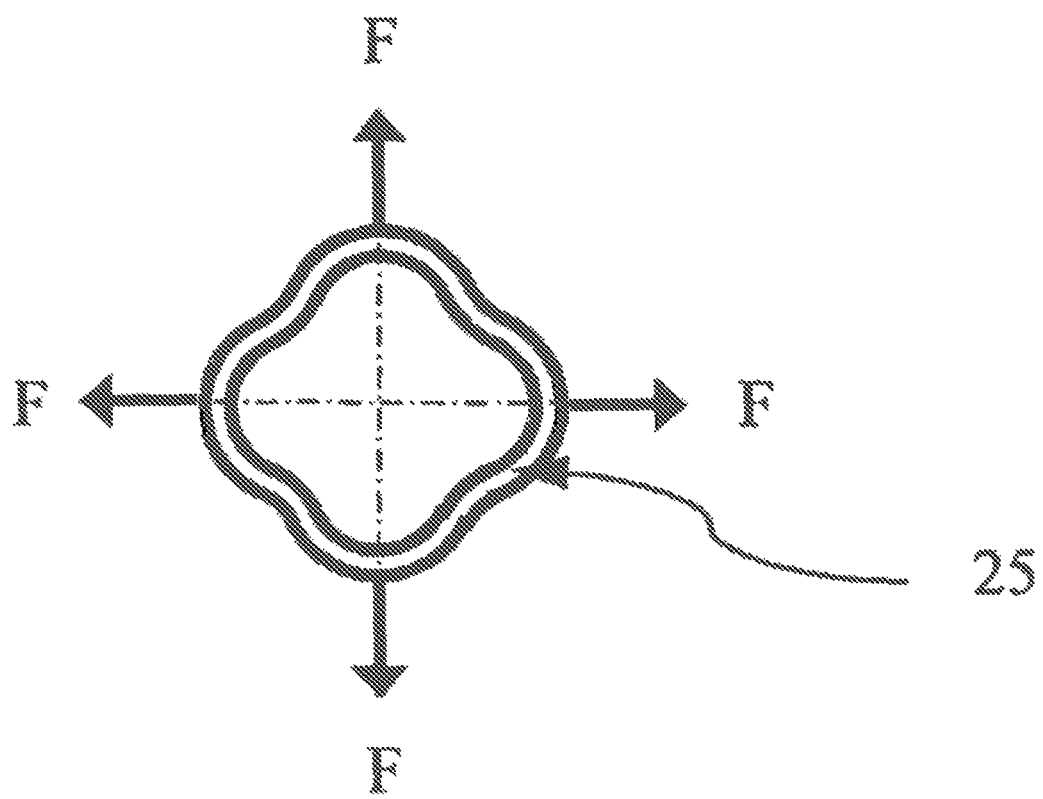
FIG. 26 shows a radially acting, meander-ring-shaped spring element according to the invention.
Figure 27:
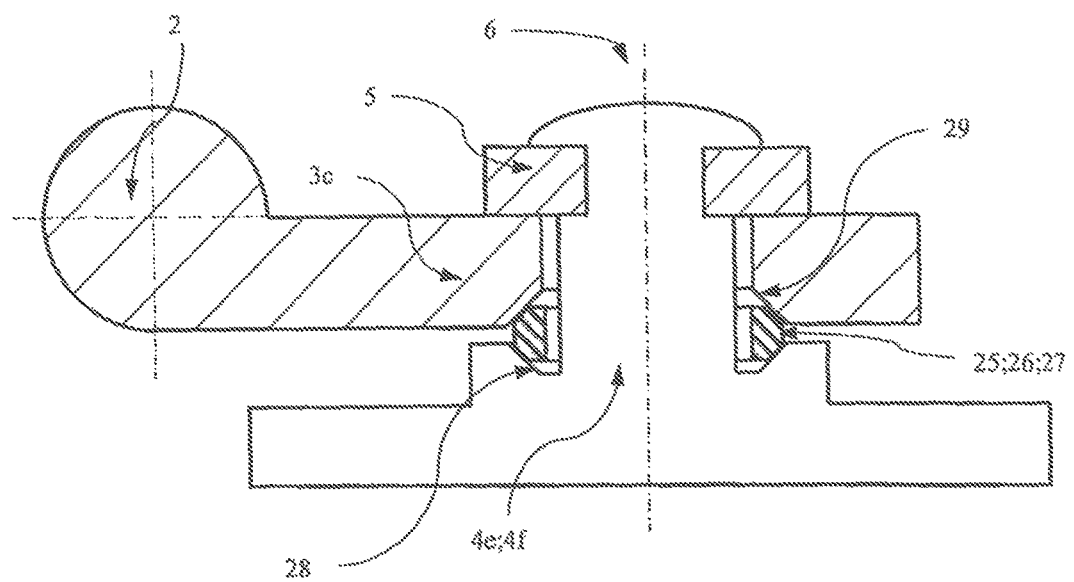
FIG. 27 shows the section A-A through the valve element according to the invention with ring-shaped spring element in a plate-mounted configuration, in a riveted variant.

FIG. 25 and FIG. 25*a* show details of FIG. 27, which is a riveted version. FIG. 26 shows the plan view of the meander-ring-shaped, radially acting spring element 25.

FIG. 27 shows the section A-A through the wastegate valve element 1 in the case of a riveted version 6 with a ring-shaped spring element 26 or 25 with trapezoidal profile 27 in a plate-mounted configuration. The shank of the flap plate 4*e*, 4*f* is led through the opening in the lever 3*c*. At the disc side, the lateral surface of the lever 3*c* rests flat against the lever-side surface of the disc 5. It is possible to see the radial clearance between the lever bore and the flap plate shank. A ring-shaped groove is formed into the elevated region of the flap plate 4*e*, 4*f* coaxially with respect to the shank, which ring-shaped groove transitions into a bevel 28. Opposite this, a bevel 29 is likewise formed into the plate in the lever bore. The space that exists between said two bevels 28 and 29 is the introduction region for receiving the ring-shaped spring element 26 or 25 with trapezoidal profile 27. The spring element 26 or 25 is supported by way of its two oblique surfaces both against the bevel 28 in the flap plate 4*e*, 4*f* and against the bevel 29 in the lever 3*c*. The disc 5 is riveted so as to abut against the shoulder on the flap plate shank. Here, the spring element 26 or 25 is pushed into the bevels 28 and 29 slightly and, in the process, is preloaded. Here, centring of the flap plate with shank 4*e*, 4*f* in the bore of the lever 3*c* is realized. The spacing between the plate-side lever surface and the elevated ring on the flap plate 4*e*, 4*f* is the axial clearance (gap dimension) by which the flap plate with shank 4*e*, 4*f* and fixedly riveted-on disc 5 can move in an axial direction in the lever bore. The cross section of the spring element 26 or 25 must be larger than the axial clearance. Thus, the spring element 26 or 25 cannot emerge from its introduction region. If the flap plate 4*e*, 4*f* is pressed onto a valve seat 23 which is skewed owing to distortion, this also gives rise to a skewed position of the flap plate with shank 4*e*, 4*f* and disc 5. As a result, the spring element is pushed deeper onto the bevels 28 and 29 and, in the process, is radially expanded by the oblique bevels 28 and 29, and is placed under even greater load. The restoring force of the spring element 26 or 25 increases until the lever surface sets down on the flap plate ring. The mechanical end stop is thus reached, and the spring element 26 or 25 can expand no further. Overloading of the spring element 26 or 25 is thus prevented (in this regard, see also FIG. 25*a*). If the wastegate valve is opened, the restoring force of the spring element 26 or 25 has the effect, via the bevels 28 and 29, that the flap plate 4*e*, 4*f* immediately returns in an axial direction and in a radial direction into its centred initial position and is held there by the preload, even if it is impinged on by a flow of the exhaust gas. Rattling is thus prevented.

FIG. 28 shows the section A-A through the wastegate valve element 1 in the case of a welded version 7 with ring-shaped spring element 26 or 25, which has a trapezoidal profile 27, in a disc-mounted configuration. The shank of the flap plate 4*a*, 4*b* is led through the opening in the lever 3*a*. At the plate side, the lateral surface of the lever 3*a* rests flat against the lever-side elevated surface of the flap plate 4*a*, 4*b*. It is possible to see the radial clearance between the lever bore and the flap plate shank. A bevel 30 is formed into the lever-side surface of the disc 5*a*. Opposite this, a bevel 16 is likewise formed into the disc in the lever bore. The space that exists between said two bevels 30 and 16 is the introduction region for receiving the ring-shaped spring element 26 or 25 with trapezoidal profile 27. The spring element 26 or 25 is supported by way of its two oblique surfaces both against the bevel 30 in the disc 5*a* and against the bevel 16 in the lever 3*a*. The disc 5*a* is welded so as to abut against the shoulder on the flap plate shank. Here, the spring element 26 or 25 is pushed into the bevels 30 and 16 slightly and, in the process, is preloaded. Here, centring of the flap plate with shank 4*a*, 4*b* in the bore of the lever 3*a* is realized. The spacing between the disc-side lever surface and the lever-side planar outer ring-shaped surface on the disc 5*a* is the axial clearance (gap dimension) by which the flap plate with shank 4*a*, 4*b* and fixedly welded-on disc 5*a* can move in an axial direction in the lever bore. The cross section of the spring element 26 or 25 must be larger than the axial clearance. Thus, the spring element 26 or 25 cannot emerge from its introduction region. If the flap plate 4*a*, 4*b* is pressed onto a valve seat 23 which is skewed owing to distortion, this also gives rise to a skewed position of the flap plate with shank 4*a*, 4*b* and disc 5*a*. As a result, the spring element is pushed deeper onto the bevels 30 and 16 and, in the process, is radially expanded by the oblique bevels 30 and 16, and is placed under even greater load. The restoring force of the spring element 26 or 25 increases until the lever surface sets down on the disc ring. The mechanical end stop is thus reached, and the spring element 26 or 25 can expand no further. Overloading of the spring element 26 or 25 is thus prevented (in this regard, see also FIG. 23*a*). If the wastegate valve is opened, the restoring force of the spring element 26 or 25 has the effect, via the bevels 30 and 16, that the flap plate 4*a*, 4*b* immediately returns in an axial direction and in a radial direction into its centred initial position and is held there by the preload, even if it is impinged on by a flow of the exhaust gas. Rattling is thus prevented.

Figures 29, 30:
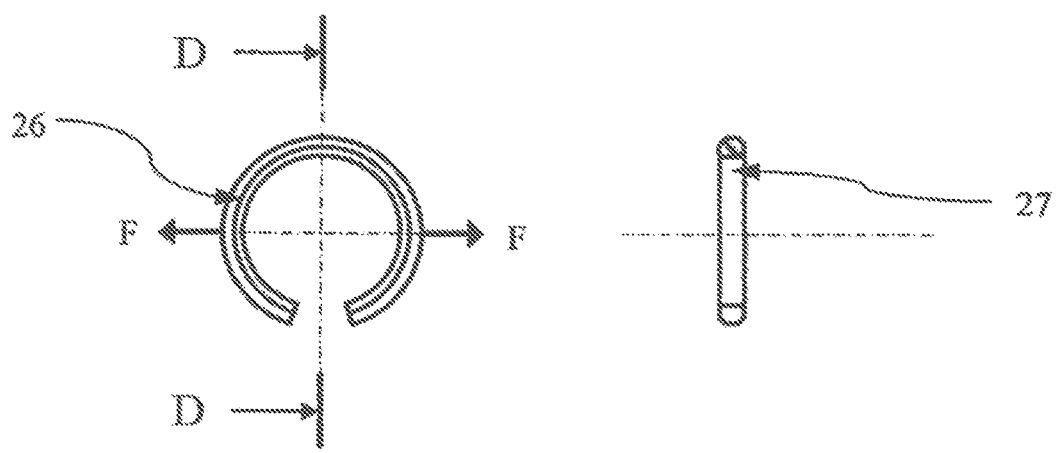
FIG. 29 shows, in a plan view, a ring-shaped spring element with cutout with trapezoidal profile for plate-side and disc-side arrangements as per FIGS. 27 and 28.
FIG. 30 shows a sectional illustration through the spring elements according to the invention of FIGS. 26 and 29 with a trapezoidal profile as per the section line D-D of FIG. 29.

FIG. 29 shows the ring-shaped spring element with a cutout 26 with trapezoidal profile 27 for plate-mounted and disc-mounted arrangement as per FIG. 27 and FIG. 28, in a plan view. The ring is not closed, such that a spring travel is possible. The spring force acts radially.

FIG. 30 shows the trapezoidal profile 27 of the spring elements 26 and 25.

The use of a radially acting ring-shaped spring element between the fastening disc and the lever (disc-side variant) or between the lever and the flap plate (plate-side variant) on one or two bevels eliminates the fluttering of the flap plate by way of a certain permanent preload. For this purpose, the embodiment of the bevels and of the ring-shaped spring element is selected such that the spring element is already pushed slightly onto the bevel(s) in the axial direction towards the flap plate shank during the assembly process. Here, the spring element is placed under load in a radial direction. Owing to the support on the oblique bevel(s), it is also the case here that a restoring force acts in an axial direction, with a centring action being realized in the case of support on two oppositely situated bevels.

The spring element imparts a vibration-damping action when the wastegate valve is open, and stabilizes the flap plate in its initial position. In the closed state, the spring element permits a skewed position of the flap plate within the range of the axial and radial clearance. During the opening process, the initial position is immediately re-established by way of the restoring force of the spring element.

The restoring or holding force of the spring element required in the respective usage situation may be set through variation of the bevel angle, the spring characteristic curve, the spring geometry and the axial and radial clearance. Experts at the spring manufacturer can select the optimum material for the respective usage situation.

The design of the introduction region or installation space for the spring element and the geometry of the spring element should be selected such that the spring element can be completely received in its introduction region when the lever is pushed into a block state both at the disc side and at the plate side (mechanical end stop). In this way, the spring element cannot be over-expanded or overloaded.

The use of the application according to the invention is independent of the method used for the fastening of the disc to the flap plate bolt. The disc may be welded on, riveted on, shrink-fitted on etc.

The valve device according to the invention may be arranged at the turbine side and/or compressor side in a bypass of an exhaust-gas turbocharger.

We claim:

1. Valve element for an exhaust-gas turbocharger, comprising:
    a spindle having a longitudinal extent;
    a lever which extends from the spindle laterally in relation to the longitudinal extent of the spindle, the lever having a through opening;
    a valve flap plate;
    a substantially disc-shaped fastening element;
    a shank which extends through the through opening and which connects the valve flap plate to the fastening element;
    the valve flap plate and the fastening element are connected to one another by way of the shank extending through the through opening of the lever;
    a spring element is provided for generating a bias between the shank and the lever;
        an introduction region in a region of the shank for receiving the spring element;
        the introduction region is formed between the lever and the fastening element;
        the introduction region includes a first lever recess on an edge of the through opening of the lever, the edge pointing toward the fastening element such that the spring element rests against the first lever recess and against the fastening element; and
        the introduction region includes a fastening element recess on a side of the fastening element, the side pointing towards the lever such that the spring element rests against the first lever recess and against the fastening element recess.

2. Valve element according to claim 1, wherein the spring element imparts a radial spring force action relative to the shank.

3. Valve element according to claim 1, wherein the spring element is of substantially meander-ring-shaped form.

4. Valve element according to claim 1, wherein the spring element is of substantially ring-segment-shaped form.

5. Valve element according to claim 1, wherein the first lever recess is a bevel formed coaxially with respect to the shank on the edge of the through opening of the lever which points towards the fastening element.

6. Valve element according to claim 1, wherein the fastening element recess is a bevel formed coaxially with respect to the shank on the side of the fastening element which points towards the lever.

7. Valve element according to claim 1, wherein a cross section of the spring element is thicker than an axial clearance between abutment surfaces of the lever and of the fastening element.

8. Valve element according to claim 1, wherein the introduction region is designed such that, after a possible breakage of the spring element, the fragments of the spring element remain in the introduction region.

9. Valve element according to claim 1, wherein the introduction region comprises abutment surfaces which run obliquely in relation to the shank extending through the through opening of the lever, in such a way that, during a movement of the valve flap plate and of the shank relative to the lever, there is a resulting radially acting spring force which pushes the valve flap plate, even when exhaust gases are flowing around the valve flap plate, in a direction of its central initial position in relation to the through opening.

10. Valve element according to claim 1, wherein the spring element has, in cross section, a trapezoidal profile, a triangular profile, a pentagonal profile, or an elliptical profile or circular profile.

* * * * *